(12) United States Patent
Kuo

(10) Patent No.: US 9,225,802 B2
(45) Date of Patent: *Dec. 29, 2015

(54) DYNAMIC OBJECT MANAGEMENT PROTOCOL

(76) Inventor: Kuo-Hua Kuo, Valencia, CA (US)

(*) Notice: Subject to any disclaimer, the term of this patent is extended or adjusted under 35 U.S.C. 154(b) by 197 days.

This patent is subject to a terminal disclaimer.

(21) Appl. No.: 13/562,090

(22) Filed: Jul. 30, 2012

(65) Prior Publication Data

US 2012/0296999 A1 Nov. 22, 2012

Related U.S. Application Data

(63) Continuation of application No. 12/586,272, filed on Sep. 18, 2009, now Pat. No. 8,234,363.

(51) Int. Cl.
*G06F 15/16* (2006.01)
*H04L 29/06* (2006.01)
*H04L 12/28* (2006.01)
*H04L 29/08* (2006.01)

(52) U.S. Cl.
CPC ............ *H04L 69/03* (2013.01); *H04L 12/2803* (2013.01); *H04L 67/12* (2013.01); *H04L 67/125* (2013.01)

(58) Field of Classification Search
CPC ....... H04L 67/12; H04L 67/125; H04L 69/03; H04L 12/2803
USPC .......................................... 709/206, 217, 230
See application file for complete search history.

(56) References Cited

U.S. PATENT DOCUMENTS

| | | | | |
|---|---|---|---|---|
| 6,446,118 | B1* | 9/2002 | Gottlieb | 709/217 |
| 6,601,064 | B1* | 7/2003 | Nag et al. | 1/1 |
| 6,668,284 | B1* | 12/2003 | Parkhurst | 719/313 |
| 7,069,345 | B2* | 6/2006 | Shteyn | 709/250 |
| 7,487,112 | B2* | 2/2009 | Barnes, Jr. | 705/26.8 |
| 7,529,351 | B2* | 5/2009 | Binning | 379/45 |
| 7,783,018 | B1* | 8/2010 | Goldberg | 379/102.06 |
| 8,055,189 | B2* | 11/2011 | Tsai et al. | 455/15 |
| 2001/0052862 | A1* | 12/2001 | Roelofs | 340/999 |
| 2002/0169914 | A1* | 11/2002 | Shteyn | 710/305 |
| 2003/0005051 | A1* | 1/2003 | Gottlieb | 709/203 |
| 2003/0065805 | A1* | 4/2003 | Barnes, Jr. | 709/231 |
| 2003/0197426 | A1* | 10/2003 | Carson et al. | 307/40 |
| 2005/0114458 | A1* | 5/2005 | Gottlieb | 709/206 |
| 2006/0023850 | A1* | 2/2006 | Feldman et al. | 379/90.01 |

(Continued)

OTHER PUBLICATIONS

RFC 4430—Kerberized Internet Negotiation of Keys (KINK), Sakane et al, Mar. 2006, The Internet Society.*

(Continued)

*Primary Examiner* — Viet Vu
*Assistant Examiner* — Michael A Chambers
(74) *Attorney, Agent, or Firm* — Smyrski Law Group, A P.C.

(57) ABSTRACT

An extensible communications protocol configured to enable dynamic discovery and management of self-aware devices in a multiple element computing architecture is provided. The protocol enables a message consisting essentially of a destination ID, a source ID, a message type, optional payloads, and a delimiter arrangement. The protocol is based on a scheme which represents structured data. Within the scheme, stacked delimiting characters are used to separate higher level data. Escape sequencers are selected to represent at least the escape character, the delimiting character, and the NULL (nothing at all).

25 Claims, 8 Drawing Sheets

(56) References Cited

U.S. PATENT DOCUMENTS

| | | | |
|---|---|---|---|
| 2006/0165161 A1* | 7/2006 | Kim et al. | 375/222 |
| 2006/0253834 A1* | 11/2006 | Cacenco et al. | 717/107 |
| 2007/0032225 A1* | 2/2007 | Konicek et al. | 455/417 |
| 2007/0230963 A1* | 10/2007 | Juszkiewicz | 398/107 |
| 2008/0117922 A1* | 5/2008 | Cockrell et al. | 370/401 |
| 2009/0009340 A1* | 1/2009 | Weaver et al. | 340/573.1 |
| 2010/0121968 A1* | 5/2010 | Clark | 709/230 |
| 2010/0131633 A1* | 5/2010 | Herlein et al. | 709/223 |
| 2010/0161149 A1* | 6/2010 | Nguyen et al. | 700/296 |
| 2010/0217837 A1* | 8/2010 | Ansari et al. | 709/218 |
| 2010/0281154 A1* | 11/2010 | Bedi et al. | 709/224 |

OTHER PUBLICATIONS

Sakane et al (RFC 4430, pp. 1-41, published in Mar. 2006).*

\* cited by examiner

DYNAMIC OBJECT MANAGEMENT PROTOCOL

This application is a continuation of co-pending U.S. patent application Ser. No. 12/586,272, entitled "Dynamic Object Management Protocol, inventor Kuo-Hua Kuo, filed Sep. 18, 2009, the entirety of which is incorporated herein by reference.

BACKGROUND OF THE INVENTION

1. Field of the Invention

The present invention relates generally to the art of communication networking protocols, and more specifically to a messaging protocol for dynamically managing objects in a distributed computer network environment.

2. Description of the Related Art

Many of today's automated system solutions are realized using multiple distributed computers connected by a communications network. Communications network design may include client-server, peer-to-peer, ring, and other distributed design architectures.

In general, current distributed computer solutions typically involve computer servers, workstations, and personal digital assistants (PDAs) with sophisticated computational and storage capabilities in communication with each other over a high bandwidth transmission media, such as the Internet.

For example, currently deployed electronic mail messaging, or Email, systems exemplify high performance distributed computer solutions constructed using client-server request-response techniques and sophisticated layered protocols, e.g. TCP/IP, FTP, and. SMTP. Email system designs typically configure server devices to perform mail transfer agent (MTA), or simply 'Email-server', transfer functionality and client devices to perform mail user agent (MUA), or simply 'Email-client' reader functionality. The MUA transfer functionality afforded by current designs, representing a layer of protocol provided in addition to certain underlying protocols, such as TCP/IP, includes receiving, forwarding, and storing electronic mail messages originating from multiple email-server and email-client computers over a network. The MUA reader functionality afforded in these designs includes requesting mail messages from a server and sending mail messages from the client to the server. Client-server system solutions of this type typically have computer resources for executing the required communication protocols, including simple mail transfer (SMTP) and post office protocols (POP), and Internet Message Access Protocol (IMAP), over a TCP/IP network to realize the transfer of electronic messages.

The Email messaging protocols thus require additional overhead, or additional information, for transmission with the original data to facilitate control of the device or application. In short, protocol overhead may increase as the distributed application functional capabilities within the networked distributed computer devices become more complex. In these designs, the multiple layered protocols must accommodate the exchange of complex control and status information. The additional overhead present in these designs require a significant amount of processing resources (i.e. CPU cycles, memory, etc.) to execute these various communication protocols. In short, complex multi-layered communications protocols require additional bandwidth for transmission and additional processing resources to affect the protocols.

In contrast, other communications network architectures are being deployed in greater numbers where the transmission medium may involve simple power and data transmissions. One example of a simplified network uses standard household electrical power wiring for the transmission of data, called the X-10 architecture. X-10 architecture designs exhibit reduced bandwidth capabilities, resulting from the use of electric power lines for data exchange, as compared with the bandwidth available over a complex network such as the Internet. The X-10 architecture and similar architectures may form a network including a wide variety of devices having little or no processing capabilities, each device configured to perform simple tasks including switching devices ON and OFF, and adjusting light dimmers. Other tasks may involve starting dishwashers, clothes dryers, heating and air conditioning systems, and opening and closing garage doors. Current X-10 architecture designs and other simplified networks include devices having minimum functionality and minimum locally stored information.

The X-10 protocol is a power line carrier protocol enabling message exchange between X-10 devices via a household power line. After proper device set up, the X-10 protocol enables control of remote appliances or devices and sensor monitoring. X-10 based controls include switching device ON and OFF, turning up or dimming down a light, and numerous other functions. Sensors can provide X-10 messages to other X-10 devices based on the occurrence of specific events.

In addition, computer interface devices, both wired and wireless (RF based), are currently available. A computer interface device enables control and/or interface with a computing device, enabling automated control and monitoring of the computing device possible. Wireless transceivers can provide an interface between the X-10 devices and a remote control device (manual or computer interface), making it possible for a user or computing device to interface with X-10 devices over the air.

Current techniques available for increasing device functionality typically involve adding processing, memory, and other computer resources to the device in conjunction with use of higher bandwidth transmission media sufficient to realize the additional functions and features. However, as in the X-10 architecture arrangement, the networked devices and associated transmission media capabilities and functionality are relatively fixed and limited according to the architecture standards.

With the introduction of X-10 based computer interfaces, various applications can provide ways to control and monitor appliances around the house. Many approaches tend to result in an ever growing, monolithic program or software module, which can be difficult to maintain and share. In addition, larger programs tend to run on one particular platform, such as Windows or Linux. While certain attempts have been made to create distributed X-10 service modules, including WEB, UPnP, WEB services, DCOM, as well as Jini based, such designs are dependent upon other protocols or OS/Language. For example the WEB may involve HTTP, TCP/IP, and HTML; UPnP may involve HTTP, TCP/IP, UDP, SOAP, and XML; WEB services may involve XML, HTTP, SOAP, WSDL, UDDL; and DCOM is a proprietary Windows technology, where Jini is centered around Java.

The limitations and restrictions inherent in network designs involving simple protocols, such as the X-10 protocol, or even complex protocols, such as TCP/IP, and similar protocols make them unacceptable in heterogeneous, distributed computing solutions and systems. Simple protocols generally operate inefficiently when used with highly intelligent or 'smart' devices, such as workstations and personal digital assistants, participating on the same heterogeneous network with 'dumb' or limited devices, such as household appliance automation, where the control of the appliance may involve operation of controllable devices such as appliances (dishwashers, ovens, heating and cooling, and lighting systems).

Based on the foregoing, it would be advantageous to provide an efficient messaging protocol for use in simple distributed systems such as a home automation system that overcomes the foregoing drawbacks present in previously known protocols.

SUMMARY OF THE INVENTION

According to one aspect of the present design, there is provided a communications protocol configured to enable dynamic management of objects between a plurality of elements in a multiple element computing architecture, the protocol enabling transmission of a message consisting essentially of a destination, a source, a message type, a number of payload sections, ranging from zero to many, as dictated by the message type, and a delimiter arrangement provided within the message. The associated payload is therefore optional.

The communications protocol enables providing one element, such as a requester element, with the ability to transmit a message, and another element, such as a responder element, configured to receive the message and take action according to the message content. A data partition arrangement may be provided, the data partition arrangement comprising a fixed number of payloads, the fixed number based on the message type, and a delimiter arrangement provided within the message, the delimiter arrangement separating data partitions in the data partition arrangement. The communications protocol enables one element to prepare requesting messages with one destination, one source, one message type and optional associated payload, the communications protocol employs escape sequences, and the one element is configured to receive the requesting message and process the message. The requesting element may be configured to form sequences of actions based on resources presented according to the protocol from the responding element, pack the actions into messages, and transmit the messages to the responding element. Delimiters are provided between the destination, the source, the message type and optional associated payload, and at an end of the message.

These and other advantages of the present invention will become apparent to those skilled in the art from the following detailed description of the invention and the accompanying drawings.

BRIEF DESCRIPTION OF THE DRAWINGS

The present invention is illustrated by way of example, and not by way of limitation, in the figures of the accompanying drawings in which.

DETAILED DESCRIPTION OF THE INVENTION

Figure 1:
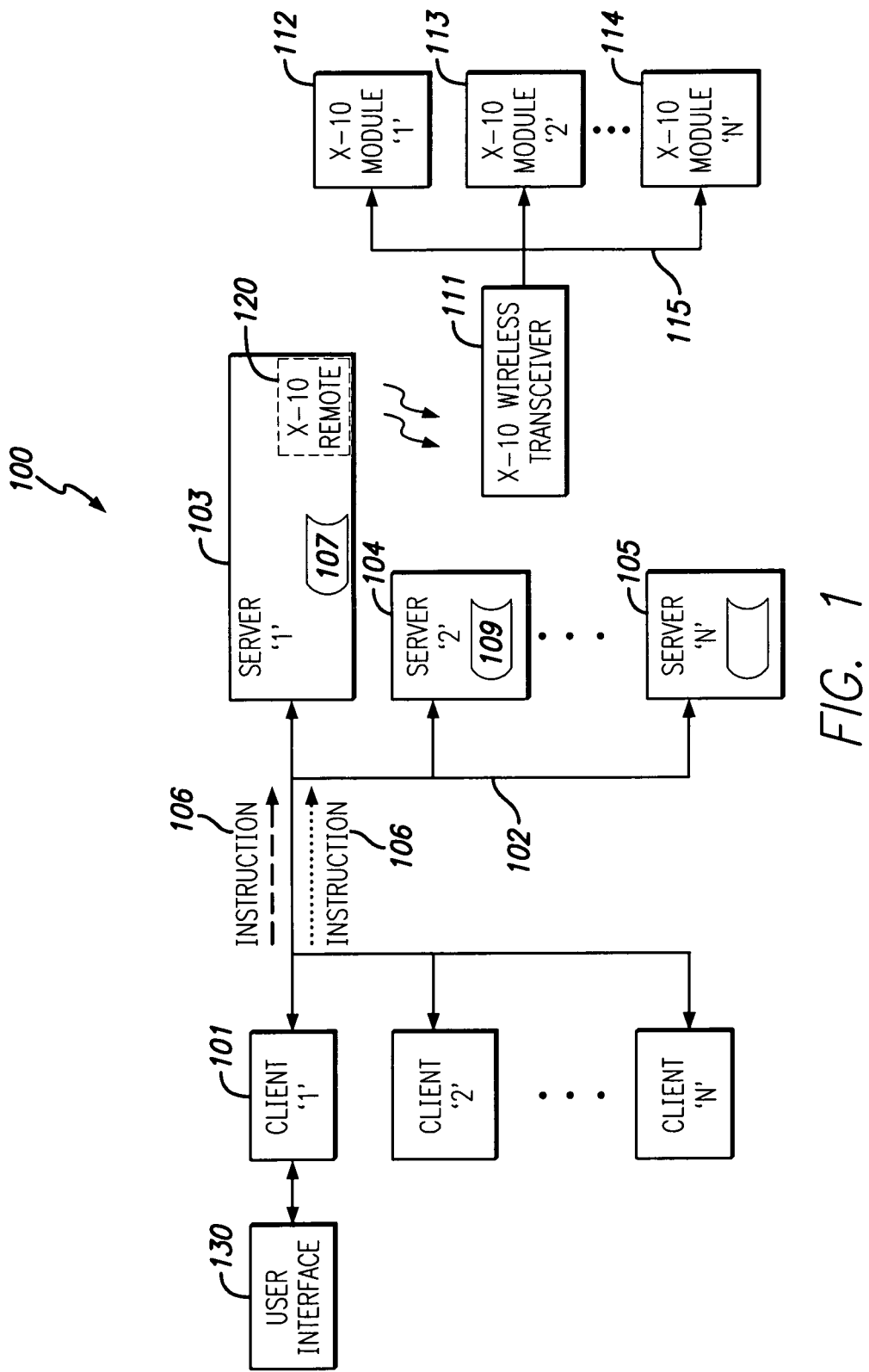
FIG. 1 illustrates an exemplary wireless X-10 architecture based system in block diagram to show the components and interfaces for a household automation system 100 in accordance with the present design.

The following description and the drawings illustrate specific embodiments sufficiently to enable those skilled in the art to practice the system and method described. Other embodiments may incorporate structural, logical, process and other changes. Examples merely typify possible variations. Individual components and functions are generally optional unless explicitly required, and the sequence of operations may vary. Portions and features of some embodiments may be included in or substituted for those of others.

The focus of the present design is a language/platform independent message protocol to make a service module, such as an X-10 control service module, that can be directly shared by other services and applications. The message protocol provided herein is extensible, allowing for addition of future features and attributes. Devices employing the current design may include a computer and associated software program, an X-10 remote device having a computer interface, an X-10 wireless transceiver and an X-10 lamp module, or other module(s). In addition, the service module is dynamically managed, meaning that the service can be dynamically discovered and is self-descriptive, or in other words "knows" all the details about its own available resources.

Often time, devices with limited resources act as "slave" devices. The present design provides platform/language independence and simplicity, allowing devices with limited resources to become dynamic service-oriented server, client, peer, or proxy devices in a distributed heterogeneous network.

The present design provides a compact data communication design for remote resource management of multiple independent networked devices and elements. The present design provides a flexible dynamic object management protocol for providing requests from a client element to enable the execution of commands or act on objects within a server element.

With the object management communications protocol provided by the present design, server elements, including many exhibiting minimum functionality and/or having minimal information stored thereon, may allow client elements to request the server elements to execute commands or act on objects without the client's prior knowledge of the commands or objects. The present design's conversational/sequential packet exchange method may involve novel and unique messaging encoding and decoding features and functionality for exchanging complex messages configured for increasing the functionality realized for objects resident within the server element.

The flexible object management protocol method and system involves a message format for the representation of structured data. In addition, the message format may provide for horizontal and vertical data encapsulation suitable for enabling the data structure to expand in both directions based on server device operational requirements. For purposes of this disclosure, vertical expansion means the buildup of higher levels of structured data. Horizontal expansion means the hosting of multiple sub-partitions within a single partition. Such encapsulation may be provided by the present design by using, for example, an escape character and a set of escape sequences.

In addition to representing every value of the underlined encoding value set, this protocol also adds a special item, Null, that is different from the NUL in ASCII. The NUL in ASCII is of value 0, but the Null in this protocol represents no value at all, instead, it represents an idea of "nothing at all". Devices with minimal functionality may be configured to exchange smaller packets via a set of message types of the present designs lightweight protocol. In this configuration, the present design may be implemented within a variety of devices having little processing and/or storage capability.

The present design may allow information exchange between two networked devices in the form of packets where the packets are configured to efficiently transmit structured data to allow the client to dynamically manage the server device. While the present design may be used in various environments and applications, it will generally be discussed herein with respect to implementation on an X-10 communications architecture that uses existing household alternating current (AC) power-line wiring as a transmission medium forming the network infrastructure merely for purposes of illustration in a specific system. It is to be particularly understood that description in such an X-10 architecture is meant to be exemplary and not limiting, and such a system may be employed in any type of remote control system, such as a wireless radio controlled toy, a robotic system, an a sensor based data collection system, a software application, an integrated software/hardware application, or any of a myriad of other applications that can benefit from a simplified protocol and/or communication arrangement.

FIG. 1 illustrates an exemplary system in block diagram form to show the components and interfaces for a household automation system 100 performing in accordance with the present design. As noted, a household automation system is illustrated, but the present protocol may be implemented in various designs, and an exemplary X-10 type implementation is illustrated. Other communication architectures may employ the present design, including but not limited to any client-server, peer-to-peer, and ring based distributed computer systems.

The embodiment illustrated in FIG. 1 contemplates that a user may operate user interface 130 to access a dynamic client '1' at 101 configured for providing control instructions to server devices 103, 104, and 105 communicated over network 102. In this network arrangement, the server devices may receive and apply control instructions, delivered from dynamic client '1' 101, or execute applications without client having prior knowledge of the control instructions or applications. For example, FIG. 1 illustrates dynamic client '1' 101 providing a control instruction 106 message destined for Server '1' 103, and an application execution instruction 108 message destined for Server '2' 104. Server '1' 103 may receive control instruction 106 and performs the instruction stored locally at 107. Server '2' 104 may receive application execution instruction 108 and invoke the application 109 stored locally. In addition, the instruction to server '1' 103 is interpreted and passed to X-10 Remote 120, then onto X-10 Wireless Transceiver 111, and communicated over household AC wiring 115 arranged as the X-10 network transmission medium to X-10 module '1' 112, X-10 module '2' 113, and X-10 module 'N' 114.

In one embodiment of the present design, household automation system 100 may operate a light switch configured with server '1' 103 by sending control instruction 106 from client '1' 101 to server '1' 103 to turn a light ON. Through server '1' 103, more than one X-10 module can be controlled, such as activating a security camera or control movements of such a security camera upon detection of movements in a monitored room under surveillance. In a further embodiment, household automation system 100 may operate a security system configured with server '2' 104 by sending application execution instruction 108 from client '1' 101 to server '2' 104 instructing the security system application 109 to configure the security camera to perform a more complex operation, such as changing the destination of the video submission in a TCP/IP network.

The present design provides for a low overhead, reliable, bi-directional dynamic object management protocol configured for use in clients acting upon server presented resources such as reviewing and editing information, invoking instructions and execution of applications stored within various server devices. For simplicity, the present design will be described for the communications path between dynamic client '1' 101 and server '1' 103, however the description may be applicable to any two distributed computer devices in communication with one another comprising part of or an entire system, and not necessarily in a server-client or master-slave centralized arrangement, but potentially in a peer-to-peer or ring or other non-centralized arrangement. In this configuration, control and signaling may be accomplished by exchanging data between client '1' 101 and the server '1' 103.

Figure 2:
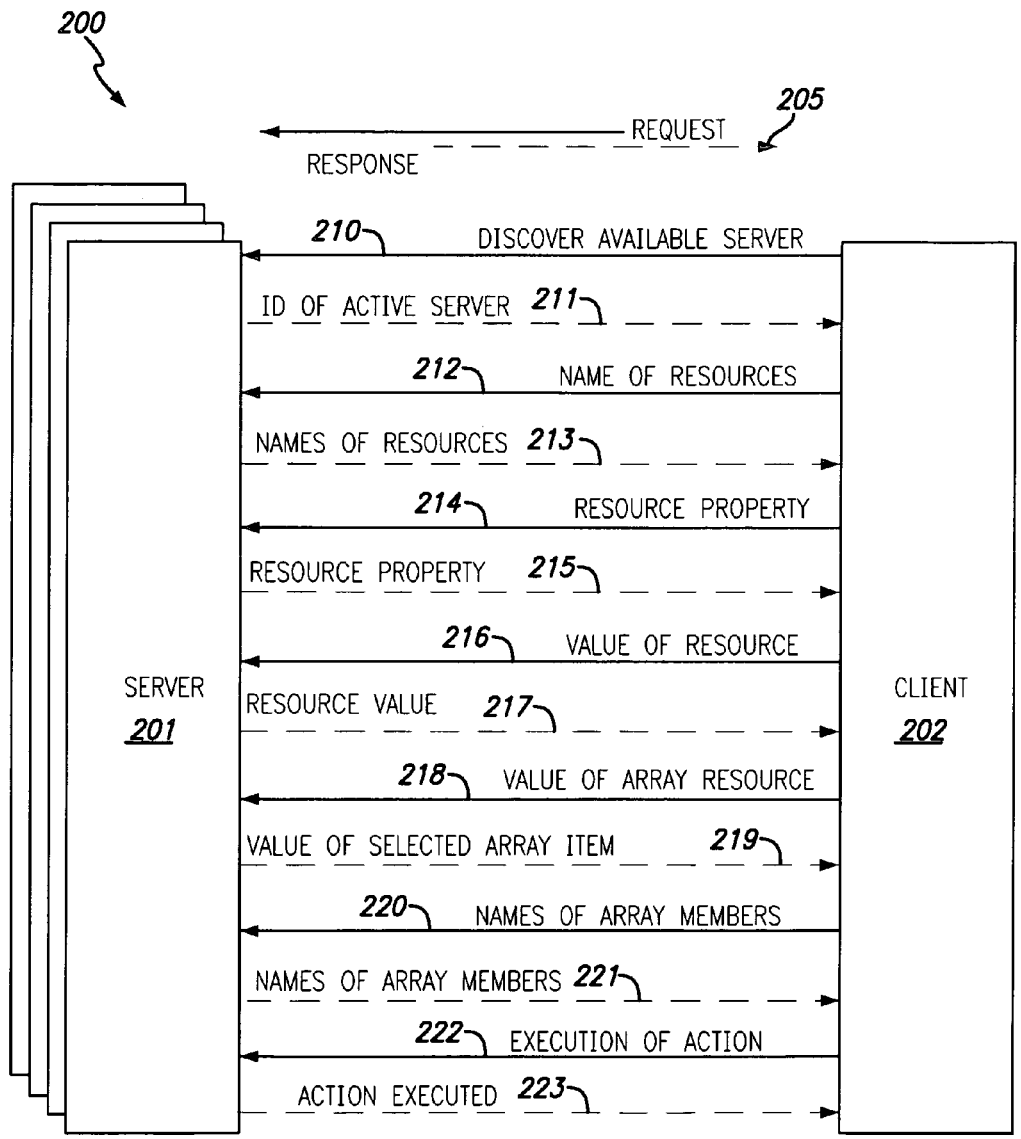
FIG. 2 illustrates a message exchange mechanism for communicating explicit requests and responses between a requester and responder device for the exchange of information in a client-server arrangement in accordance with the present design.

FIG. 2 illustrates a message exchange mechanism 200 for communicating explicit requests and responses at point 205 between a requester and responder device for the exchange of information in a client server arrangement in accordance with the present design. In essence, the resource information exchange of the present design operates by the client first discovering the server. Note that as used herein, the terms "client" and "server" are employed to generally mean "requester" and "responder," respectively, and not specifically a network requiring a centralized client. The client inquires as to the names of all resources, and the server replies with the names of all resources, in the X-10 server example including resources such X-10's inherent House Code, Unit Code, ON, OFF, etc. In addition, the present design provides for new resources, such as assigning X-10 Devices with unique and meaningful names such as "Living Room Chandelier".

The client then may inquire about the properties for each resource, where the properties may include data type, access type, and value. The client device may inquire further if necessary, and in the case of an array, may result in the client device inquiring about array members. The client device subsequently acts on the received information. The server replies with an action result. A list of refreshed resource(s) name/value pair or a unique ID representing a specific group of resources may be provided.

Server 201 may enable client 202 or other clients to compose various automation scripts and provide those scripts to the server by supplying client 202 or other clients with needed resources, such as information/action resources, logic, time, composing functions or other information. Once composed, such script becomes the server's newly added resource and is dynamically acquired in the same manner as other resources.

Scripts are not limited to composed new actions. They can be constructed to represent other things such as protocol items like a new message type or data type. This helps with the compatibility with future devices that may not support older message types and/or data types. After all, a powerful device today might one day become a legacy device in a short amount of time. Since such change usually occurs in the changeable data storage area, the present design may avoid firmware updating requirements, which typically require intensive testing before its release.

A common message follows the pattern of "destination/source/message_type/message_content". Message_content in this context may be from Null to complex structured data that encapsulates, contemplates, accounts for, or interacts with other packets. The format of the message_content is dictated by message_type. Since the protocol is extensible, the present design may provide for creating new optional message types and data types. Existing devices, e.g. servers and clients, can still function within the protocol, but such devices simply do not support those new protocol items. Both client and server are aware of the supported items such as message/resource/access types to ensure that the communication is within the mutually supported framework. In addition, more complex devices may support both simple and complex message types and resource properties. This helps ensure the compatibility between complex and simple devices. With simple message types likely being shorter, the present design may lessen the burden of simple devices, allowing more devices to support the protocol, hence increasing eligible members of the ever-expanding dynamic heterogeneous network.

FIG. 2 shows a generalized interaction between client and server, or requesting device and responding device. In FIG. 2, server 201 and client 202 may be two separate independent software execution environments comprising the applications software and the underlying operating systems. The present design may provide messages from the controlling client to at least one connected server device or element. The present design provides a request-response message exchange 200 communication mechanism between client and server devices. Client 202 may send requests seeking to discover available server 210 over the network in an effort to identify active available system servers. In this example, server 201 may reply with ID of Active Server 211 response indicating a status of available, active, and ready-for-use server(s). Client 202 may send a "names of resources" request 212 to server 201. Server 201 may reply by sending names of all applicable resources embedded in Names of Resources response 213. For each resource, client 202 may send resource property request 214 to server 201 to dynamically obtain a property, or properties, associated with each resource. In this arrangement, server 201 may reply by sending resource property 215 response to client 202.

The present design may be configured to support information, action, information array, and action array. The action and action array may have only one access type: Read. The information and information array may possess one of several access types such as Read, Write, or Read/Write. The present design may configure client 202 to send a value of resource request 216 to server 201. Server 201 may reply with resource value response 217 to client 202.

For arrays, client 202 may send value of array resource request 218 to server 201. Server 201 may reply to the client request by sending the value of selected array item resource 219. In addition, Client 202 may send names of array members request 220 to server 201. Server 201 may reply to the client request by sending names of array members response 221. Client 202 may send an action 222 to server 201, and server 201 may reply to the client request by sending action response 223. Client 202 may invoke a server action with an attached parameter. An action may involve the addition, removal, or modification of a resource or an array member. Thus in general, FIG. 2 illustrates the interaction between the requesting device and the responding device, providing queries to discover the active server, etc., and receiving responses including resource data and various pertinent values that can be employed by the requesting entity to perform the necessary task(s).

In the light switch example, the sequence of events leading to the control of the light switch has been completely dependent upon the use of server-supplied resources, be it information or action.

Figure 3:
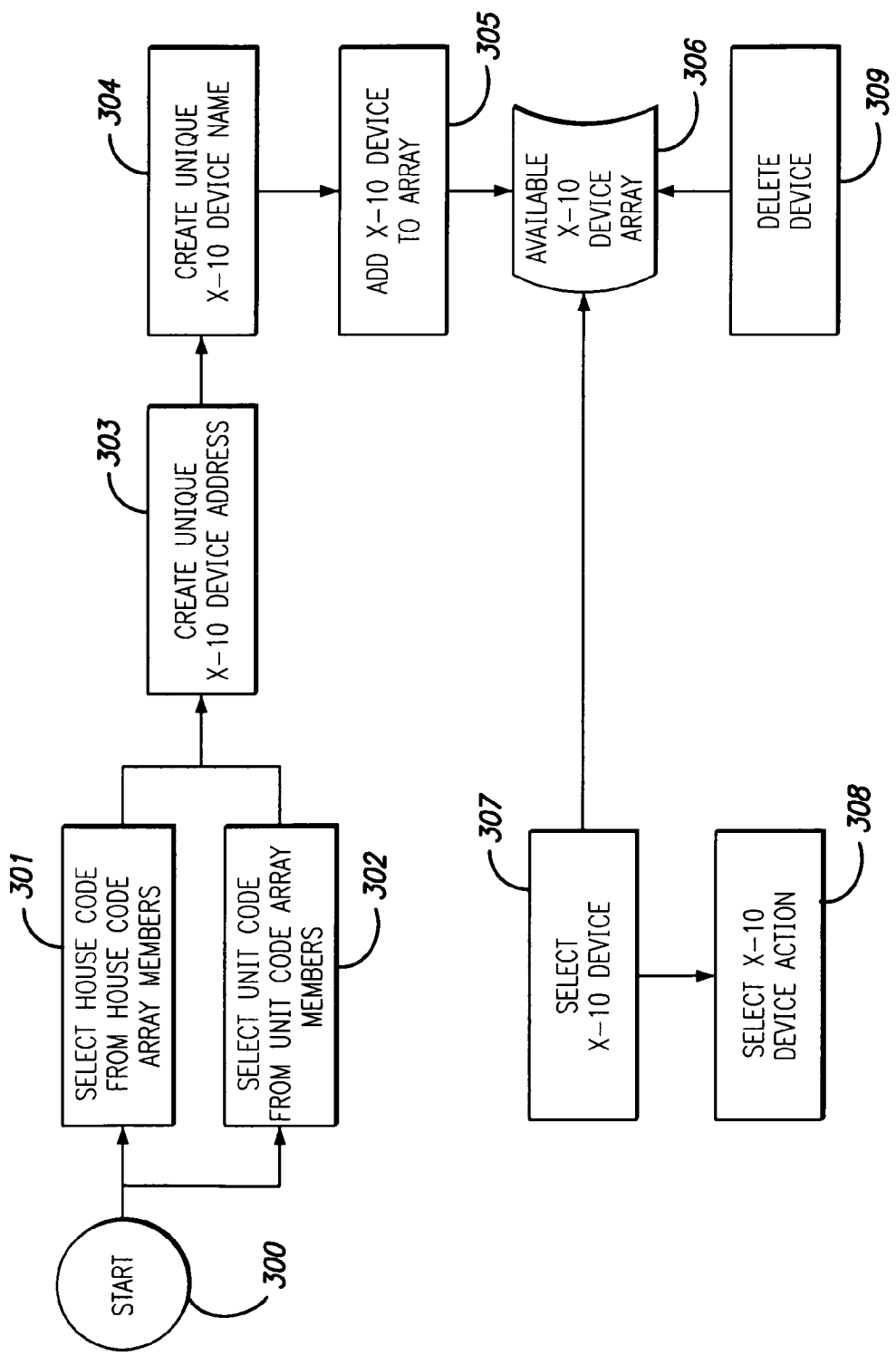
FIG. 3 illustrates a flowchart for a client executing actions or managing server stored information without prior knowledge of the actions or information in accordance with the present design.

FIG. 3 illustrates a flowchart for a client executing server actions or managing server stored information without prior knowledge of the actions or information in accordance with the present design. The design shown in FIG. 3 illustrates an example implementation of the present design's dynamic object management functionality where the server provides the client with two arrays at point 300. The two arrays are used to manage X-10 devices codes within the network, such as home automation system 100 illustrated in FIG. 1. The first array may involve, for example, house codes A through P, and the second array may involve unit codes such as 1 through 16.

The present design's client arrangement may select a house code at point 301 and a unit code at point 302 from the two arrays received from the server. The server may combine the selected house and unit code to create unique X-10 device address at point 303. In addition, the server may provide the client with all the necessary resources to create unique X-10 device name to represent this combination at point 304. The present design may allow the server to add such X-10 device name to array at point 305 to an array of available X-10 device array at point 306, stored locally within the server. The present design may result in the client assigning "kitchen overhead light" as B-13, where B represents a particular room, such as a kitchen of a house, and 13 represents the overhead light in the kitchen, or a binary indication such as "0111011", where 011 represents the kitchen in a particular structure and 1011 represents overhead light or overhead light switch or switch functionality. This identification may be added to the available device array at point 306. After the successful assignment, the server will make permanent the association between "kitchen overhead light" and its underlined X-10 device address B-13.

The client may select X-10 device for operation at point 307 and may select X-10 device action, being an action to be performed on the desired X-10 device, at point 308. For example, the kitchen overhead light actions may include but are not limited to turn-on, turn-off, increase illumination output, and decrease illumination output, for purposes of setting room lighting level. In addition, the client may delete device 309, from available X-10 device array at point 306. Furthermore, some servers might allow script editing for client to orchestrate complex actions as turning off the kitchen overhead light at a specific time, turning on the kitchen overhead light when it is dark, and many other possibilities.

Figure 4:
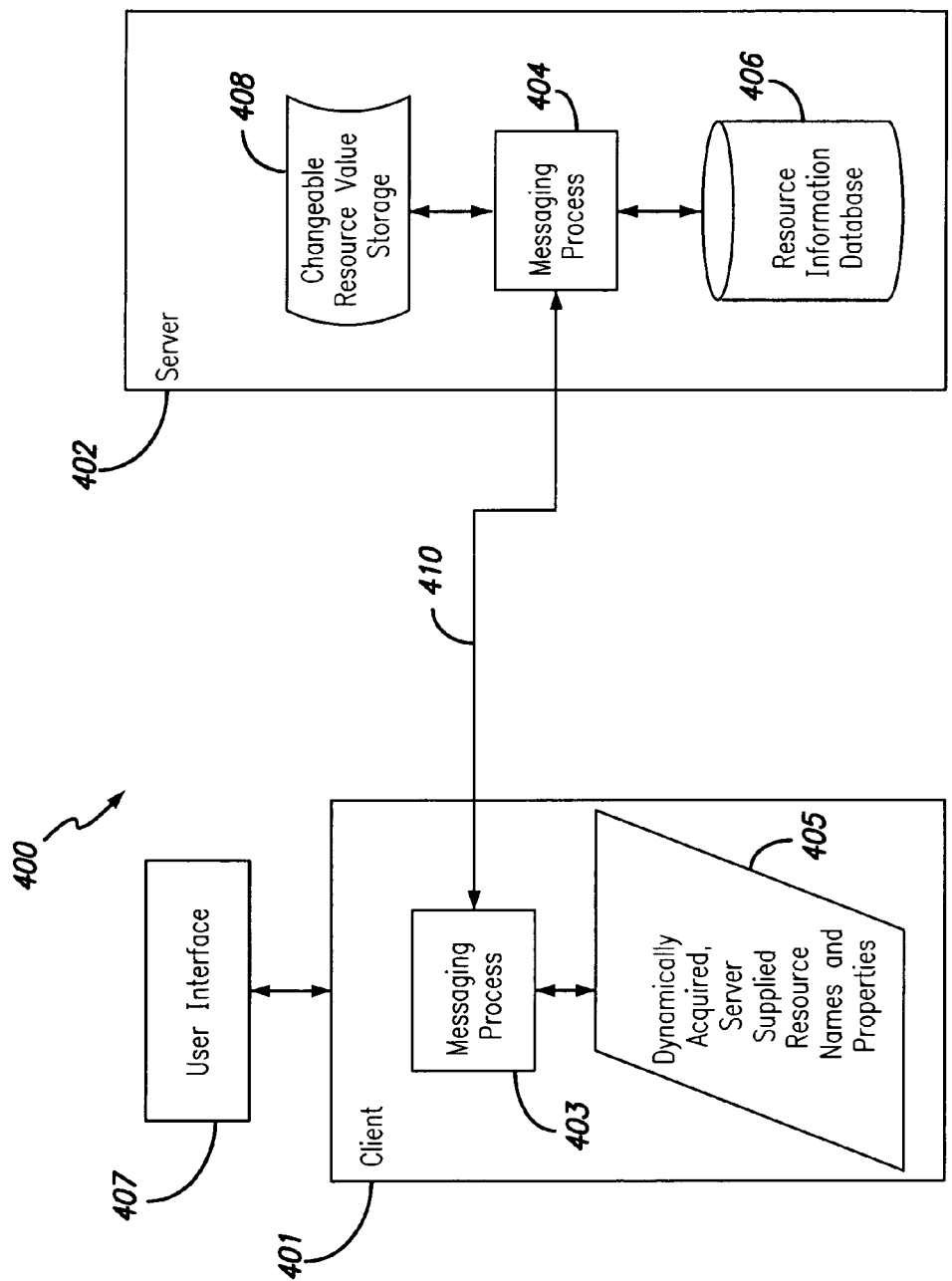
FIG. 4 illustrates a system block diagram for realizing a dynamic object management (DOM) protocol arrangement configured for efficient communications between networked devices and elements in accordance with an aspect of the present design.

FIG. 4 illustrates a dynamic object management (DOM) protocol 400 arrangement configured for efficient communications between networked devices. In this arrangement, the DOM protocol may combine an extensible messaging protocol with a set of message types, resource properties, and a set of data encoding and message packing rules. DOM protocol 400 features and functionality may provide for a server to modify information resources upon the request of client and provide the modified information resources to said client over a common heterogeneous network. In conjunction with providing the modified information resources, the client may also send actions (including script) to the server for execution on the objects. In the situation where the client is an "intelligent" or "smart" device, the client may modify and enhance object functionality automatically acting on server's resources if the client is so programmed. Smart clients may be configured to perform intelligent actions based on pre-set or latter added rules and scripts, where the information is communicated in association with the disclosed protocol.

In short, the present design's messaging protocol may allow for future extensions to be realized by client and server devices, such as are found in peer-to-peer devices residing on a network where the peer devices may execute both 'client' and 'server' device functionality. Referring to FIG. 4, client device 401 may include messaging process 403, which provides the efficient extensible messaging protocol for communicating with the messaging process 404 of server device 402. Client device 401 may interoperate with server device 402 in a peer-to-peer, client-server, and other distributed computer-networking architectures. The present design's extensible messaging protocol may include but is not limited to a set of message types, where the message protocol contains a fixed number of sections as required by each message type. Resource properties may include but is not limited to data type, access type, and resource value. The present set of data types may include but is not limited to information, action, information array, and action array data types.

Access types may include but are not limited to read, write, and read/write access types. The DOM protocol may involve encoding and packing rules where the encoding rules include but are not limited to at least one delimiter, at least one escape character, a set of escape sequences with one representing "Null", a stacked delimiter arrangement representing the level of structured data and at least one structured data section. In addition, the encoding rules may provide for nested encapsulation of data where more than one sub-section of data may be included within a section and layered structured data can be presented, both without ambiguity.

Client device 401 may communicate with server device 402 using networking infrastructure 410 as a transmission channel for operating DOM protocol 400. For example, the messaging process 403 of client device 401 may initiate the present design's sequential conversation, illustrated in FIG. 2, where the messaging process 404 of server device 402 processes and responds to inquiries regarding resource information stored locally within server resource information database 406. Inquires may include but are not limited to requesting resource information such as the name of each available resource stored in resource information database 406, the data type and access type associated with each available resource, the value and properties associated with each resource. Server device 402 may respond to each inquiry by packing and sending the requested information from resource information database 406 to the client device originating such inquiries. Client device 401 includes an acquisition module 405 configured to dynamically acquire server supplied resource names and properties, and can provide this data to messaging process 403.

On receipt of complete resource information the client device messaging process 403 may perform various operations based on this information. User interfacing operations may include but are not limited to formatting the information for rendering and presentation for a user interacting with user interface 407 to accept and formulate user request for submission to server device 402. Other operations may include the mechanization of one or more prescribed actions, such as running a client side script, without any user intervention. In this manner, the DOM protocol's sequential conversion may increase or reduce packet size based on the client and server device capabilities.

For example, the method may provide for a devices configured with a limited amount of memory, low data rate network access, and small processor, to exchange smaller packets with other devices by using the mutually supported small-packet oriented message types. In addition, the sequential conversation allows client-server device arrangements to exchange large packets as found in commercial business and operational support systems, such as manufacturing applications interacting with sales, ordering, and financial applications.

With growing extension capabilities, the majority of message types and resource properties available with the DOM protocol method described herein are optional, allowing for the coexistence of simple and complex objects.

The server device's resource information database 406 may include hard-coded resource types, access types, and resource values and may provide for a changeable resource value storage 408 file configured for storing changeable resources. In the situation where changeable resource value storage 408 does not yet exist, the server device may create changeable resource value storage 408 and populate the file with predefined default values. In the situation where changeable resource value storage 408 already exists, the source device may read the changeable resources value storage 408 file and use them as default values for associated resources. Any subsequent operation that changes any resource value will result in the update of changeable resource value storage 408 file(s).

The communication messages exchanged between messaging process 403 and messaging process 404 using network infrastructure 410, as illustrated in FIG. 4, and the resource information database 406 involve and adhere to the encoding and packing rules. Details regarding encoding and packing rules are described below as part of the disclosed message format. Messaging processes 403 and 404 may exchange packets, for example participating in a peer-to-peer, client-server arrangement, or ring network configuration, where the message format is:

Destination ID^Source ID^Message Type^Payload 1^Payload 2^ . . . ^^ where the total payloads are fixed, and may range from zero to many, as dictated by the collection of message types of DOM protocol 400. In addition, for each requesting message type originating from a client, a matching responding message type may be obtained from the server. When realized in peer-to-peer or ring type networks, the present design may provide for broadcasting or multicasting commands where objects may decode the payload. When the message is not addressed to the recipient, the message may be relayed without modification. When the message is addressed to the recipient, the recipient may package the decoded payload from previous objects with its own reply, and encode the new payload available for delivery to the next object. This way, the message may still abide by the protocol format but may carry more replying payloads.

A client device may have built-in knowledge of and a control interface for many existing objects. Such existing objects may include televisions, video recording devices, known object control algorithm, and so forth, and such client devices may be configured to manage additional dynamic objects simultaneously. In a further embodiment, the present design may be realized in a stand-alone arrangement, or may be constructed as an extension to an existing device.

Although FIG. 4 illustrates the requesting and responding devices operating in a client-server arrangement, the present design may arrange requesting client device 401 and responding server device 402 to execute both client and server DOM protocol functionality. In this manner, the present design may provide protocol features and functionality for requesting and responding devices participating as peers. As noted, the protocol arrangement may provide for operating between multiple distributed computing devices independent of the operating system, programming language, or medium used by the computing devices.

Message Format

Figure 5:
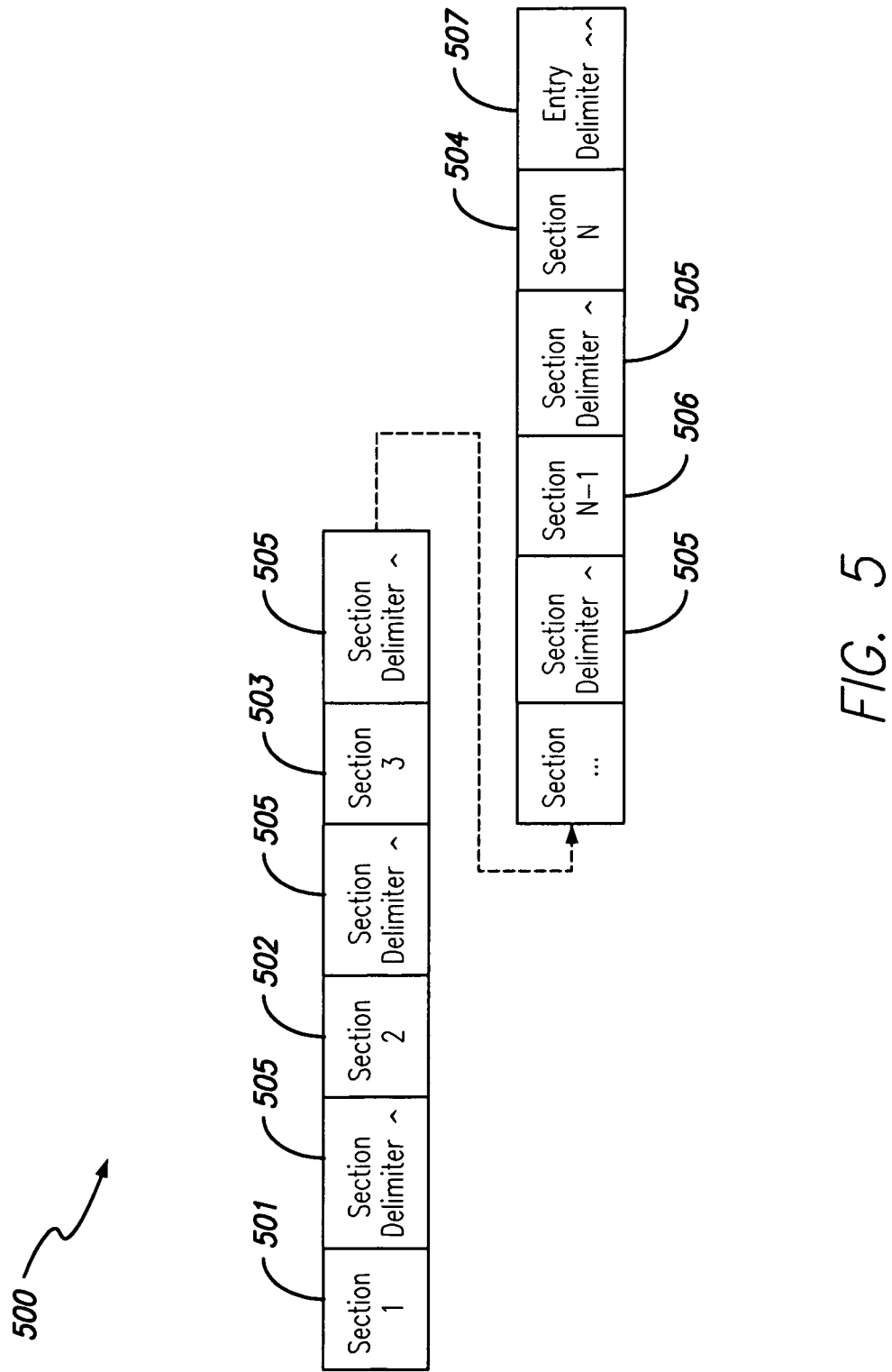
FIG. 5 illustrates an exemplary message entry format including one or more message sections that result from applying the novel encoding and packing techniques to the original data contents in accordance with the present design.

FIG. 5 illustrates an exemplary message entry format 500 including one or more, in this example 'N', message sections that result from applying the encoding and packing techniques to the original data contents in accordance with the present design. Message entry format 500 may involve one or more message sections, for example section 1 at 501, section 2 at 502, section 3 at 503, and so forth up to the final section N at 504. The message format may employ an encoding rule for message entries containing a plurality of message sections wherein a section delimiter is placed after each message section up to an including message section N−1 at 506.

FIG. 5 illustrates section delimiters 505 (^) resulting from the application of the message format encoding rule. The message format may involve a further encoding rule where an entry delimiter 507 (^^) is positioned after the last message section N at 504.

Rule Y provides the rule for Message Partition Packing. According to Rule Y, the content of a current level partition is encoded before being packed into the upper level partition according to the Rule X encoding described below. For example, the content of a Section is encoded before being packed into an Entry. Once properly encoded, a delimiter is placed after such partition for proper separation. If this is the last partition, a terminating delimiter is placed. For example, a Section delimiter is placed between Sections, and an Entry delimiter is placed after the last Section. Further, if a current level partition is an expected array, then each item is encoded and packed according to the requirements spelled out above in this Rule Y. After that, this packed ensemble is encoded again when it is packed with other partitions of the same level.

In this arrangement, the present design's message format encoding rules may provide for multiple items to reside in the same higher-level message partition of the data structure. Alternately, any message partition may contain one or more message sub-partitions via nested encapsulation, and may allow for each sub-partition to form a starting node enabling further branching. For example, the present design's message may limit data structure to three levels: section, entry, and record, with record being the highest level. The sub-partition may include but are not limited to an encoded message section, message entry, message record, and so forth enabling nesting of data and messages.

Section delimiters are provided and the form of such delimiters is immaterial—as long as both the transmitting entity and the receiving entity understand section delimiter, virtually any reasonable form of delimiter is acceptable. The present disclosure employs (^), and the choice of (^) as a section delimiter is arbitrary. Other characters may be used for purposes of delimiting sections, the lowest among all levels of structure data. Once the section delimiter is decided, every higher level partition is delimited based on a stacked arrangement. Under such arrangement, the Nth level partition will be delimited by N section delimiters, stacked one after the other. For example, if level 1, section, delimiter is ^, then level 2 partition, entry, is delimited with ^^ and level 3 partition, record, is delimited with ^^^, and so forth.

Figure 6:
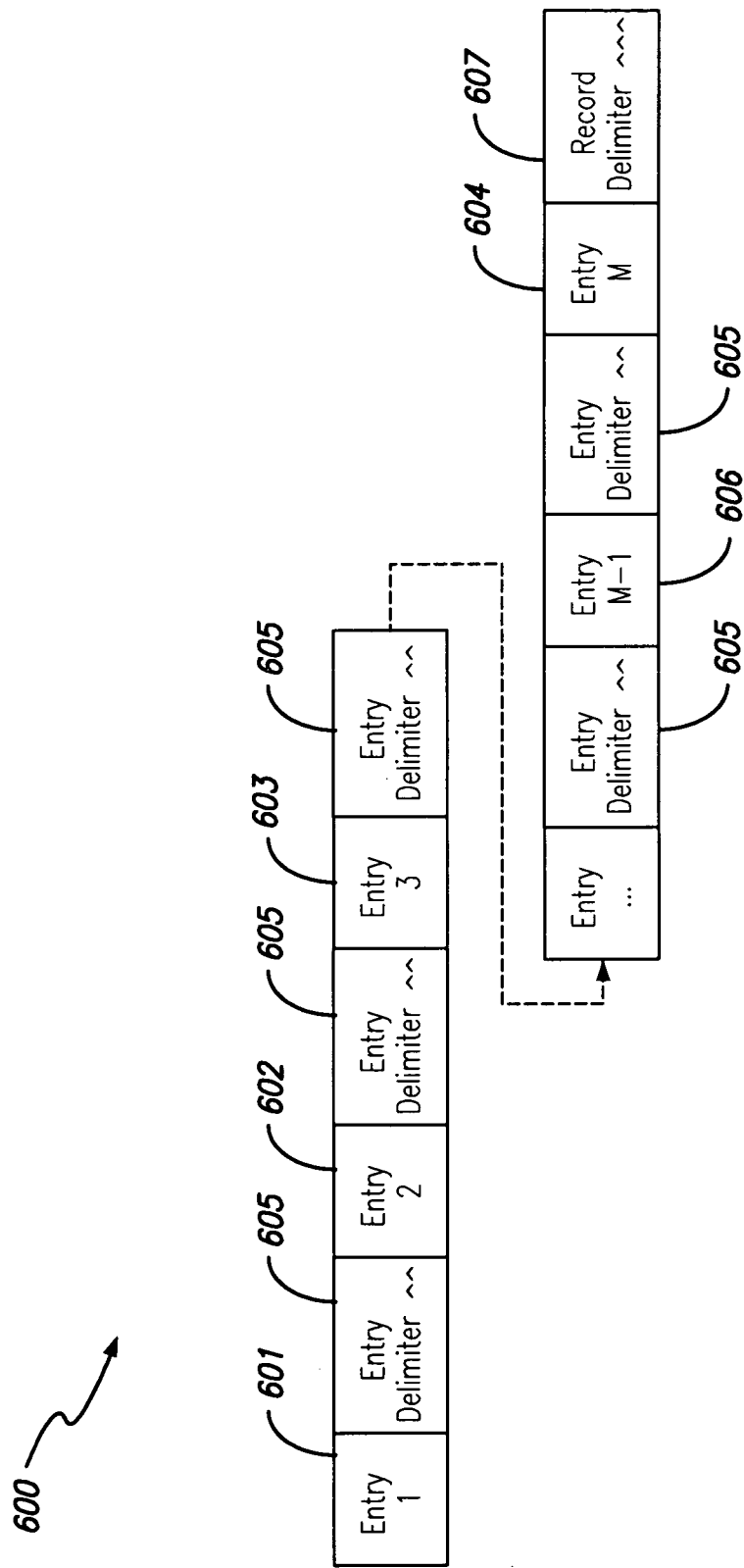
FIG. 6 illustrates an exemplary message record format including one or more message entries that result from applying the novel encoding and packing techniques to the original data contents.

FIG. 6 illustrates an exemplary message record 600 format including one or more, in this example 'M', message entries that result from applying the novel encoding and packing techniques to the original data contents in accordance with the present design. Message record 600 is conceptually one level up in the protocol from the message entry level. The message record 600 format may involve one or more message entries, for example entry 1 at 601, entry 2 at 602, entry 3 at 603, and so forth up to the final entry M at 604. The present message format may involve an encoding rule for message records containing a plurality of message entries wherein an entry delimiter is placed up to an including message entry M−1 at 606. FIG. 6 illustrates an entry delimiter 605 (^^) resulting from the application of the message format encoding rule. The message format may involve a further encoding rule where a record delimiter (^^^) is positioned at 607 after the last entry M at 604.

In this arrangement, the present message format entry delimiter encoding rule may involve further delimiters (^^^^), (^^^^^), and so forth for expanding the present data structure in both the vertical and horizontal direction. In this manner, the message formatting method may continue to expand with a next level delimiter equal to the current level delimiter plus the section delimiter (^).

The present design, insofar as encoding and packing is concerned, employs a delimiter understood by both the requesting and responding entities as being the division of information. Escape sequences are also provided. Characters represented by escape sequences may include, but are not limited to Null, delimiter, and the escape character. Stacked delimiters may be provided representing multiple and/or layers of structured data. A packet according to the current design can have single or multiple field(s) of simple data, hierarchical, structured simple data, another packet according to the present design, including a simple or complex packet, a hierarchical, structured packet, and/or a mixture of the above.

Encoding and Decoding Examples

In order to appreciate the application of the present message format encoding and packing rules, two encoding and decoding examples will be described, and as can be appreciated, a myriad of applications may be realized using the present protocol and packing/encoding rules.

Rule X: Encoding rules may modify original content. The present design encoding rules for providing flexible dynamic object management may include:

(a) using the tilde character "~" as an 'escape character' where the tilde is positioned as the leading character for each escape sequence;

(b) encoding section delimiter ^ with escape sequence ~#;

(c) encoding escape character ~ with escape sequence ~~;

(d) encoding NULL with escape sequence ~*;

(e) contents containing neither special characters (~ or ^) nor NULL may remain the same after encoding;

(f) contents containing a special character (~ or ^) or Null are encoded accordingly; and (g) In addition, without being Escaped, a Null section makes the section delimiter before and after equal an entry delimiter, resulting in confusion when decoding the message. Introduction and use of escaped Null can avoid such failure.

For example, the following three non-array message sections are to be packed into a message entry:

section 1: a single F1 which does not contain any special character;

section 2: a single G^2~ which contains special characters, ^ and ~; and section 3: a single NULL.

The steps followed detail the processes required to encode these three sections into the message entry:

F1^G~#2~-^~*^^

This encoding is followed by processes required to decode this message entry back to those three original message sections.

Encoding:

Section 1: F1, result: F1

Since there is no special character within the section, the encoded section is the same: F1

No terminating delimiter is required as this is a single item section.

Section 2: G^2~, result: G~#2~~

The special character ^ is encoded to ~# and ~ is encoded to ~~, the encoded section will be: G~#2~~

No terminating delimiter is required as this is a single item section.

Section 3: NULL, result ~*

The special character NULL and is decoded into ~*, resulting in the encoded section of: ~*

No terminating delimiter is required as this is a single item section.

Now, packing all 3 sections into an entry with proper delimiters results in:

F1^G~#2~~^^

Decoding:

The first round of parsing results in three sections, based on section delimiter ^ and entry delimiter ^^:

Section 1: F1

Section 2: G~#2~~

Section 3: ~*

Further decoding of each section yields the final result:

Section 1: F1

Section 2: GΔ2~

Section 3: NULL.

In another example, the following five array message sections are to be packed into a message entry.

section 1: an array with three members: #H1, H*2, and H3
section 2: an array with three members: I1^, NULL, and I~3
section 3: an array with one member: J1
section 4: an array with one member: NULL
section 5: an array with two members, first member being K1, and second member being an array of 2 members: K21, K22

The processes required to encode these 5 sections into the message entry:

H1~#H*2~#H3~#~#^I1~~#~#~~*~#I~~~~3~
~#^J1~#~#^~~*~#~#^K1~#K21~~#K22~~#~~#~#~#^^ is discussed, followed by processes required to decode this message entry back to those five original message sections.

Encoding:

Section 1: an array with members #H1, H*2, and H3, result: #H1~#H*2~#H3~#~#;

For an array, the first step is to encode each member: #H1, H*2, and H3; and

Not being led by escape character ~, no escape sequences are required for # and * at #H1 and H*2.

So the encoding sections are #H1, H*2 and H3 respectively.

Secondly, place proper delimiters, hence #H1^H*2^H3^^

Finally, encode according to Rule X: #H1~#H*2~#H3~#~#

Section 2: an array with members I1^, NULL, and I~3, result: I1~~#~#~#I~~~~3~#~#

For this array, the first step is to encode each member: I1^, NULL, and I~3

^ is encoded into escape sequence ~#, first member I1^ is encoded into I1~#

NULL is encoded into ~*, second member NULL is encoded into ~*

~ is encoded into ~~, third member I~3 is encoded into I~~3

Secondly, placing proper delimiters ^ and ^^ for an array, resulting in I1~#^~*^I~~3^^

Finally, encode according to Rule X: I1~~#~#~~*~#I~~~~3~#~#

Section 3: an array with 1 member J1, result: J1~#~#

For this array, the first step is to encode the sole member: J1

Not having any special character, J1 is encoded into J1

Secondly, place proper delimiters, hence J1^^

Finally, encode according to Rule X: J1~#~#

Section 4: an array with 1 member NULL, result: ~~*~#~#

For this array, initially encode the sole member, hence: ~*

Secondly, place proper delimiters, hence: ~*^^

Finally, encode according to Rule X: ~~*~#~#

Section 5: an array with two members, K1, and an array of two members: K21, K22, result: K1~#K21~~#K22~~#~~#~#~#

First, encode each member of array K21, K22 into K21 and K22

Next, place proper delimiters, hence K21^K22^^

Then, encode the array with members K1 and K21^K22^^ into K1 and K21~#K22~#~#

After placing proper delimiters, it becomes: K1^K21~#K22~#~#^^

Finally, encode it according to the Rule X: K1~#K21~#K22~~#~#~#~#

Now, packing all five sections into an entry with proper delimiters yields:

H1~#H*2~#H3~#~#^I1~~#~#~~*~#I~~~~3~#~#^J1~
~#^~~*~#~#^K1~#K21~~#K22~~#~~#~#~#^^

Decoding:

The first round of parsing results in five sections, based on section delimiter ^ and entry delimiter ^^.

H1~#H*2~#H3~#~#
I1~#~#~~*~#I~~~~3~#~#
J1~#~#
~~*~#~# and
K1~#K21~#K22~~#~~#~#~#

Section 1: #H1~#H*2~#H3~#~# first round of decoding: #H1^H*2^H3^^ after parsing, an array of three members: #H1, H*2, and H3 since no member contains a special character, the decoding results in the same members: #H1, H*2, and H3

Section 2: I1~~#~#~~*~#I~~~~3~#~# first round of decoding: I1~#^~*^I~~3^^ after parsing: an array of 3 members: I1~#, ~* and I~~3 decoding of each member: I1^, NULL, and I~3

Section 3: J1~#~# first round of decoding: J1^^ after parsing: an array of one member: J1 decoding of this member: J1

Section 4: ~~*~#~# first round of decoding: ~*^^ after parsing: an array of one member: ~* decoding of this member: NULL

Section 5: K1~#K21~#K22~#~~#~#~# first round of decoding: K1^K21~#K22~#~#^^ after parsing: an array of two members: K1 and K21~#K22~#~# decoding of first member K1: K1 decoding of second member K21~#K22~#~#: K21^K22^^
parsing of second member: K21 and K22
decoding of these 2 members K21, K22: K21, and k22
final result: an array of two members: first member K1 and second member an array of two members: K21 and K22.

The choice of tilde (~), ^, # and * used in the above encoding rules and examples is arbitrary, whereas the use of NULL is intended to mean empty content. The present design message format encompasses the entire character set, plus the NULL. For example, if the ASCII character set is used, then the present design will cover all values ranging from 0 to 127, plus the NULL. If the UTF-8 character set is used, then the present design covers all values plus the NULL.

The present mechanism and protocol may allow for managing the interoperation of distributed networked devices, based on known device hardware capabilities and stored software functionality, via existing or newly created objects where each object may, internally or externally, facilitate the creation of custom data or methods, where required. Hence, new resource types and methods may be deployed without requiring a hardware, software, or firmware upgrade to modify existing objects. The present flexible dynamic object management protocol helps enable "smart" and "dumb" network devices to add new features and execute new features remotely and dynamically. In addition, the present design facilitates coping with later added encoding and packaging rules and scripts. In addition, the present 'lightweight' protocol design may provide for both static and dynamic object management where dynamic management provides for objects to create or modify their data and/or methods based on new or predetermined scripts.

Figure 7:
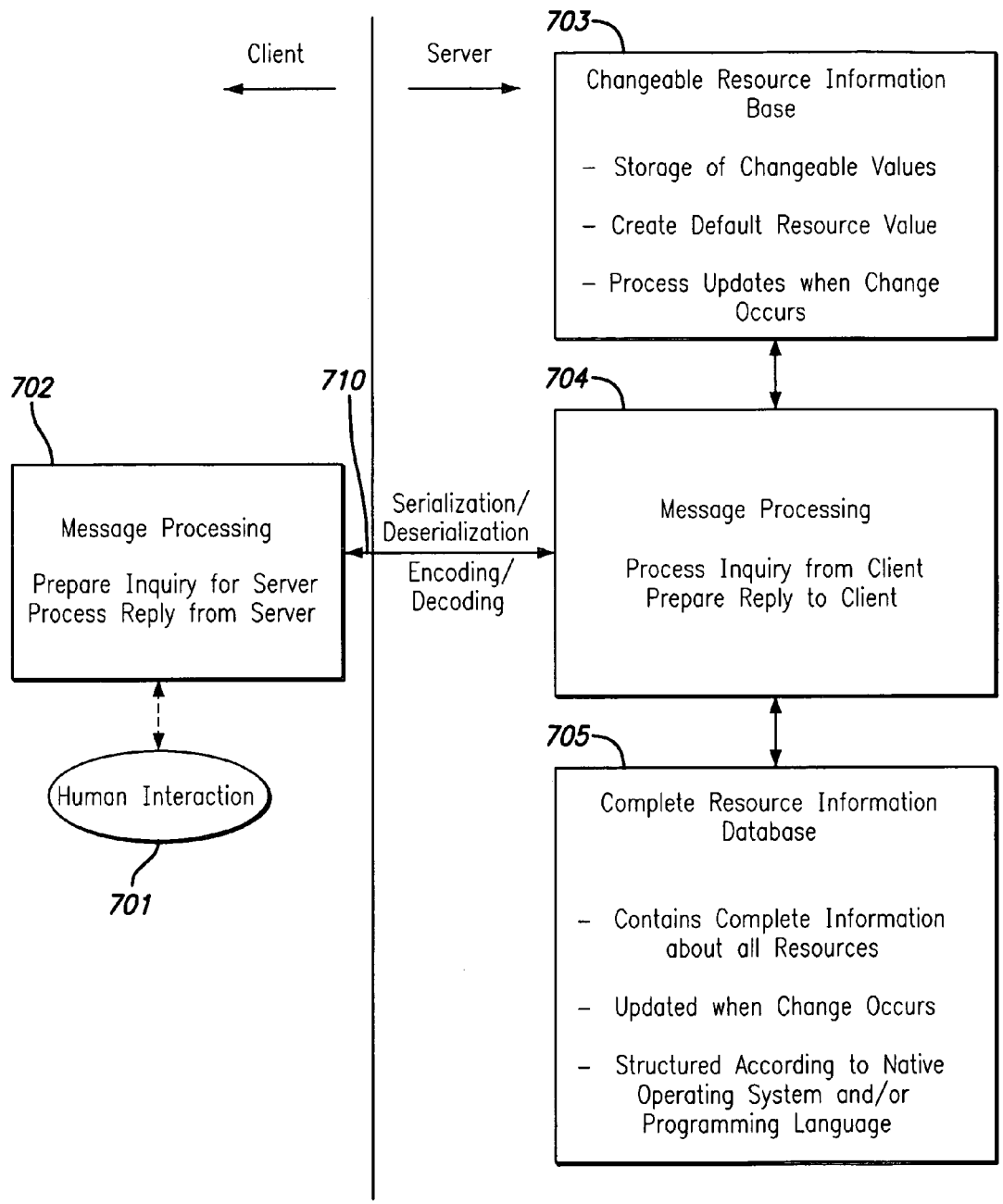
FIG. 7 illustrates a general overview of operation of the present design or a design employing the present protocol.

FIG. 7 illustrates an overall generalized illustration of the present "lightweight" protocol, where as shown in FIG. 7, client operation is shown on the left, server operation on the right. FIG. 7 has similarities to FIG. 4, and presents additional detail regarding the processes and procedures associated with use of the present protocol. Point 701 indicates that the client may have human interaction, in the form of data entry or data display, if allowed, or flipping a switch or flashing of lights, or other appropriate and available user interaction. Message processing 702 may prepare inquiries for the server and process replies from the server. Encoding and packing of structured message data occurs using the protocol disclosed herein within client message processing 702 as well as server message processing 704, discussed below. Serialization and encoding occurs between the server and client at 710, as does de-serialization and decoding.

The server maintains a non-volatile, Changeable Resource Information Base 703 file that may contain the identity, properties and changeable values of resources. The server can create a default file with default values if one does not already exist. If one does exist, the content is recalled and placed in the Complete Resource Information Database 705 upon power-up initialization. When changes occur, the server will record the changes into the file and update the Complete Resource Information Database 705 accordingly.

Server message processing 704 provides for message handling on the server side, where inquiries from a client are processed and replies to clients prepared. Message handling may rely on a resource information base, illustrated as resource information base 705, which typically contains complete information about all resources. The resource information base 705 may be updated whenever a change occurs, and may be structured according to the native operating system and/or programming language to facilitate retrieval of information, formation of messages or execution of methods, and transmission of messages according to the protocols established herein.

Example Implementation

One implementation of the present design is turning on and off a light switch. All resources within a server device have existing, known functionality, typically maintained at a central location, such as complete resource information base 705. In such a situation, a language that is understandable by the light switch controller is also available and understood at the server device.

The operation of such a design is as follows.

Discovery of Device
From Client: ?^aClient^?Discover^^
 Destination ID: ?, a reserved ID
 Source ID: aClient. The name is chosen to help with clarity, i.e. nonredundancy and simple understandability of the name.
 Message Type: ?Discover
 Payload: None
 Mission: client asks for the server ID
From Server: aClient^CM17aServer^!Discover^O.K.^^
 Destination ID: aClient
 Source ID: CM17aSerrver, prefix "CM17a" is chosen as it is the wireless X-10 controller in this example.
 Message Type: !Discover
 Payload: the processing result "O.K.".
 Mission: server answers with its ID Inquiry of the Names of all Resources within the Device
From Client: CM17aServer^aClient^?Resources^^
 Destination ID: CM17aServer
 Source ID: aClient
 Message Type: ?Resources
 Payload: None
 Mission: The client asks for names of server's resources
From Server:
aClient^CM17aServer^!Resources^turn ON~#turn OFF~#DIM 005~#BRIGHT 005~#House Code~#Unit Code~#Device Address~#~#^O.K.^^
 Destination ID: aClient
 Source ID: CM17aServer
 Message Type: !Resources
 Payload: The first section contains the encoded entry of server's resources (turn ON^turn OFF^DIM 005^BRIGHT 005^House Code^Unit Code^Device Address^^) The second section contains the processing result: "O.K."
 Mission: The server replies that it has seven resources: turn ON, turn OFF, DIM 005, BRIGHT 005, House Code, Unit Code and Device Address.

Once executed, "DIM 005" will dim down 5% and "BRIGHT 005" will brighten up 5% of the whole range of AC supply voltage. Once the client receives and decodes the server's resources, the client continues inquiring as to the properties of each resource.

Inquiry of the Type Property of Resource "turn ON"
From Client: CM17aServer^aClient^?ResourceType^turn ON^^
 Destination ID: CM17aServer
 Source ID: aClient
 Message Type: ?ResourceType
 Payload: The only payload section is the name of the resource: "turn ON"
 Mission: The client asks for the "Type" property of resource "turn ON"
From Server: aClient^CM17aServer^!ResourceType^turn ON^Action^O.K.^^
 Destination ID: aClient
 Source ID: CM17aServer Message Type: !ResourceType
Payload: The first section is the resource name: "turn ON". The second section is the responded property: "Action". The last payload section is the processing result: "O.K."
Mission: The server replies that the "Type" property of "turn ON" resource is "Action"
For "Action" type resource, no further inquiries are needed.
Inquire the Type Property of "turn OFF" Resource
From Client: CM17aServer^aClient^?ResourceType^turn OFF^^
   Destination ID: CM17aServer
   Source ID: aClient
   Message Type: ?ResourceType
   Payload: The only payload section is the name of the resource: "turn OFF"
   Mission: The client asks for the "Type" property of resource "turn OFF"
From Server: aClient^CM17aServer^!ResourceType^turn OFF^Action^O.K.^^
   Destination ID: aClient
   Source ID: CM17aServer
   Message Type: !ResourceType
   Payload: The first section is the resource name: "turn OFF". The second section is the responded property: "Action". The last payload section is the processing result: "O.K."
   Mission: The server replies that the "Type" property of "turn OFF" resource is "Action"
Inquire the Type Property of "DIM 005" Resource
From Client: CM17aServer^aClient^?ResourceType^DIM 005^^
   Destination ID: CM17aServer
   Source ID: aClient
   Message Type: ?ResourceType
   Payload: "DIM 005"
   Mission: The client asks for the "Type" property of resource "DIM 005"
From Server: aClient^CM17aServer^!ResourceType^DIM 005^Action^O.K.^^
   Destination ID: aClient
   Source ID: CM17aServer
   Message Type: !ResourceType
   Payload: The first section is the resource name: "DIM 005". The second section is the responded property: "Action". The last payload section is the processing result: "O.K."
   Mission: The server replies that the "Type" property of "DIM 005" resource is "Action"
Inquire the Type Property of "BRIGHT 005" Resource
From Client: CM17aServer^aClient^?ResourceType^BRIGHT 005^^
   Destination ID: CM17aServer
   Source ID: aClient
   Message Type: ?ResourceType
   Payload: "BRIGHT 005"
   Mission: The client asks for the "Type" property of resource "BRIGHT 005"
From Server: aClient^CM17aServer^!ResourceType^BRIGHT 005^Action^O.K.^^
   Destination ID: aClient
   Source ID: CM17aServer
   Message Type: !ResourceType
   Payload: The first section is the resource name: "BRIGHT 005". The second section is the responded property: "Action". The last payload section is the processing result: "O.K."
   Mission: The server replies that the "Type" property of "BRIGHT 005" resource is "Action"
Inquire the Type Property of "House Code" Resource
From Client: CM17aServer^aClient^?ResourceType^House Code^^
   Destination ID: CM17aServer
   Source ID: aClient
   Message Type: ?ResourceType
   Payload: "House Code", the inquired resource
   Mission: The client asks the "Type" property of resource "House Code"
From Server: aClient^daServer^!ResourceType^House Code^InfoArray^O.K.^^
   Destination ID: aClient
   Source ID: CM17aServer
   Message Type: !ResourceType
   Payload: The first section is the resource: "House Code". The second section is the responded property: "InfoArray". The last section is the processing result: "O.K."
   Mission: The server replies that the "Type" property of "House Code" is "InfoArray"
For "InfoArray" type resource, subsequent inquiries are needed to find out more about the array.
Subsequent Inquiry of the Array Members of "House Code" Array
From Client: CM17aServer^aClient^?ArrayMembers^House Code^^
   Destination ID: CM17aServer
   Source ID: aClient
   Message Type: ?ArrayMembers
   Payload: "House Code", the inquired resource
   Mission: The client asks for the members of the "House Code" array
From Server: aClient^CM17aServer^!ArrayMembers^House Code^
A~#B~#C~#D~#E~#F~#G~#H~#I~#J~#K~#L~#M~#N~#O~#P~#~#^O.K.^^
   Destination ID: aClient
   Source ID: CM17aServer
   Message Type: !ArrayMembers
   Payload: The first section: "House Code", the inquired resource, next section: the encoded entry of array members (A^B^C^D^E^F^G^H^I^J^K^L^M^N^O^P^^), the last section: the processing result: "O.K."
   Mission: The server replies that the "House Code" array has following members: A, B, C, D, E, F, G, H, I, J, K, L, M, N, O, and P.
Subsequent Inquiry of the Value(Selected Member) of "House Code" Array
From Client: CM17aServer^aClient^?Value^House Code^^
   Destination ID: CM17aServer
   Source ID: aClient
   Message Type: ?Value
   Payload: "House Code", the inquired resource
   Mission: The client asks for the Value (Selected Member) of the "House Code" array
From Server: aClient^CM17aServer^!Value^House Code-^K^O.K.^^
   Destination ID: aClient
   Source ID: CM17aServer
   Message Type: !Value
   Payload: first section: "House Code", the inquired resource, next section: the Value (Selected Member): K, the last section: the processing result: "O.K."
   Mission: The server replies with the Value (Selected Member) of the "House Code" array
Inquire the Type Property of "Unit Code" Resource
From Client: CM17aServer ^aClient^?ResourceType^Unit Code^^
   Destination ID: CM17aServer Source ID: aClient
Message Type: ?ResourceType
Payload: "Unit Code", the inquired resource
Mission: The client asks the "Type" property of resource "Unit Code"
From Server: aClient^daServer^!ResourceType^Unit Code^InfoArray^O.K.^^
Destination ID: aClient
Source ID: CM17aServer
Message Type: !ResourceType
Payload: The first section is the resource: "Unit Code". The second section is the responded property: "InfoArray". The last section is the processing result: "O.K."
Mission: The server replies that the "Type" property of "Unit Code" is "InfoArray"
Subsequent Inquiry of the Array Members of "Unit Code" Array
From Client: CM17aServer^aClient^?ArrayMembers^Unit Code^^
Destination ID: CM17aServer
Source ID: aClient
Message Type: ?ArrayMembers
Payload: "Unit Code", the inquired resource
Mission: The client asks for the members of the "Unit Code" array
From Server: aClient^CM17aServer^!ArrayMembers^Unit Code^1~#2~#3~#4~#5~#6~#7~#8~#9~#10~#11~#12~#13~#14~#15~#16~#~#^O.K.^^
Destination ID: aClient
Source ID: CM17aServer
Message Type: !ArrayMembers
Payload: The first section: "Unit Code", the inquired resource, next section: the encoded entry of array members (1^2^3^4^5^6^7^8^9^10^11^12^13^14^15^16^^), the last section: the processing result: "O.K."
Mission: The server replies that the "Unit Code" array has following members: 1, 2, 3, 4, 5, 6, 7, 8, 9, 10, 11, 12, 13, 14, 15, and 16.
Subsequent Inquiry of the Value (Selected Member) of "Unit Code" Array
From Client: CM17aServer^aClient^?Value^Unit Code^^
Destination ID: CM17aServer
Source ID: aClient
Message Type: ?Value
Payload: "Unit Code", the inquired resource
Mission: The client asks for the Value (Selected Member) of the "Unit Code" array
From Server: aClient^CM17aServer^!Value^Unit Code^14^O.K.^^
Destination ID: aClient
Source ID: CM17aServer
Message Type: !Value
Payload: first section: "Unit Code", the inquired resource, next section: the Value (Selected Member): 14, the last section: the processing result: "O.K."
Mission: The server replies with the Value (Selected Member) of the "Unit Code" array
Inquire the Type Property of "Device Address" Resource
From Client: CM17aServer^aClient^?ResourceType^Device Address^^
Destination ID: CM17aServer
Source ID: aClient
Message Type: ?ResourceType
Payload: "Device Address", the inquired resource
Mission: The client asks the "Type" property of resource "Device Address"
From Server: aClient^daServer^!ResourceType ^Device Address^Info^O.K.^^
Destination ID: aClient
Source ID: CM17aServer
Message Type: !ResourceType
Payload: The first section is the resource: "Device Address". The second section is the responded property: "Info". The last section is the processing result: "O.K."
Mission: The server replies that the "Type" property of "Device Address" is "Info"
Subsequent Inquiry of the AccessType Property of "Device Address" Resource
From Client: CM17aServer^aClient^?AccessType^Device Address^^
Destination ID: CM17aServer
Source ID: aClient
Message Type: ?AccessType
Payload: "Device Address", the inquired resource
Mission: The client asks the "AccessType" property of resource "Device Address"
From Server: aClient^daServer^!AccessType^Device Address^Read^O.K.^^
Destination ID: aClient
Source ID: CM17aServer
Message Type: !AccessType
Payload: The first section is the resource: "Device Address". The second section is the responded property: "Read". The last section is the processing result: "O.K."
Mission: The server replies that the "AccessType" property of "Device Address" is "Read"
Subsequent Inquiry of the Value of "Device Address" Resource
From Client: CM17aServer^aClient^?Value^Device Address^^
Destination ID: CM17aServer
Source ID: aClient
Message Type: ?Value
Payload: "Device Address", the inquired resource
Mission: The client asks for the Value of the "Device Address" resource
From Server: aClient^CM17aServer^!Value^Device Address^K14^O.K.^^
Destination ID: aClient
Source ID: CM17aServer
Message Type: !Value
Payload: first section: "Device Address", the inquired resource, next section: the Value: K14, the last section: the processing result: "O.K."
Mission: The server replies with the Value of the "Device Address" resource
Up to this stage, the client has all the necessary knowledge about the server to perform desired actions such as selection of House Code, selection of Unit Code, Device Address to be acted upon, turn ON, turn OFF, brighten, and dim an X-10 device.
To Turn ON an X-10 Device "K14"
From Client: CM17aServer^aClient^?Action^turn ON^^~*^^
Destination ID: CM17aServer
Source ID: aClient
Message Type: ?Action
Payload: first section: "turn ON", the Action resource, second section: ~* (the encoded NULL), attachment for the action.
Mission: client asks the Server to turn ON its selected X-10 device. (K14)
From Server: aClient^CM17aServer^!Action^turn ON^~*^O.K.^^
Destination ID: aClient
Source ID: CM17aServer Message Type: !Action
Payload: first section, "turn ON, the Action resource, second section: Null, attachment for the action reply, last section: processing result, "O.K."
Mission: server replies with the confirmation that the action was executed successfully
The execution of Turn OFF, BRIGHT 005 and DIM 005 will follow the same fashion by replacing the resource name "turn ON" in both messages.
To Change House Code to "F"
From Client: CM17aServer^aClient^?Set^House Code^F^^
   Destination ID: CM17aServer
   Source ID: aClient
   Message Type: ?Set
   Payload: first section: "House Code", the designated resource, second section: F, the desired new House Code
   Mission: client asks server to change the selected House Code member to F
From Server: aClient^CM17aServer^!Set^House Code^F^Device Address~#F14~#House Code~#F~#~#^O.K. ^^
   Destination ID: aClient
   Source ID: CM17aServer
   Message Type: !Set
   Payload: first section, "House Code", the designated resource, second section: F, the desired new House Code, third section: list of resources with their new values, last section, processing result: "O.K."
   Mission: server replies that it has successfully issued House Code change to F. In addition, it presents resources which have new values:
   Device Address: F14 and
   House Code: F
If the desired Unit Code is 16, simply replace the resource name "House Code" with "Unit Code" and desired value "F" with "16" in both messages. Once executed, the X-10 Device Address becomes "F16".
When a server does not recognize a message type, say "?Discover", the server will reply with an error message with the same requesting Message Type. (instead of the expected "!Discover")
aClient^CM17aServer^?Discover^Unrecognized Message Type^^
If the server detects that the client is not on its authorized user list, it may send the following reply without revealing its ID:
aClient^?^?Discover^Unrecognized Message Type^^
The selection of names is arbitrary. However, selection of intuitive names like "Discover" may help human interpretation of the message. The use of prefixes ? and ! are also arbitrary. They are chosen for the same reason. The key is for both server and client to support the message type pairs such as ?Discover and !Discover.
The above example represents a set of message exchanges that are designed to allow the client to successfully learn about all the resources presented by the server and then take actions without prior knowledge.
New message types, resource types, resource properties and methods can be created and added to dynamically represent the server to clients. The key to making it work is to ensure that each server and client support the same set of types and properties mentioned.
The following example illustrates how a client successfully composes a script on a server which turns on the living room light at 19:00. The design of FIG. 8 communicates explicit requests and responses as shown by the lines at point 805 between a client and server device. Server(s) 801 and client 802 are illustrated. The server resources involved include a List of Device Alias, a List of Alias Actions, a List of Scripts, a list of Components for Selected Script, a List of Script Actions, a List of Script Component Type, a List of Time Unit, a List of 10× Time Value, a List of 1× Time Value, and a List of X-10 Controls.

The List of Device Alias, an Info array, represents collection of association between an X-10 Device Address such as F16 and an intuitive name such as "living room light."

The List of Alias Actions, an Action array, allows the client to work on the list of device aliases.

The server 801 decides on available actions and presents them to the client dynamically. When the server 801 first starts, the server does not have any alias, hence the alias list is empty and the alias actions array has only one member: Add. When the list of device alias is no longer empty, the action array has two members: Add and Remove.

The List of Scripts is an info array that contains all scripts. The selected script is the one that the script related action will act upon.

A list of components for selected script is provided as an info array. It contains components of the selected script. For example, a server might have components with types like Time, Action, and Alias.

The List of Scripting Actions is an action array that allows the client to work on the list of scripts with actions like Add, Remove, Activate, De-activate, and so forth.

The server decides on the available actions based on selected script and presents to client dynamically. For example, when the server first starts, there is no script. Hence the only script action will be Add. When the script list contains script, the action list increases to Add, Remove. If the selected script is executable but inactive, Activate action is added to the action list. If the selected script is active, De-Active action will be added to the action list instead. Actions related to the components of the script are available accordingly. Examples are Add Component to Script, Remove Component from Script. In addition, what is available depends on the selected script and its components.

A List of Script Component Type is an Info array used for the client to select the type of script component to be worked on, such as Time, X-10 Controls, and Device Alias.

A List of Time Unit is an Info array that allows the client to select the unit of time, such as Hour or Minute, to be worked on.

A List of 10× Time Value is an Info array, having a range dependent upon the selected time unit. Such as Hour: 0 to 2, Minute: 0 to 5.

The List of 1× Time Value is an Info array. Again, the range is dependent upon the selected time component, such as Hour: 0 to 4 when 10× is 0 or 1, 0 to 3 when 10× is 2. Minute: 0-9.

A List of X-10 Controls includes an Info Array and contains the X-10 controls such as "turn on", "turn off", "Brighten5%", "Dim5%"

The interaction between the client and server are:
   assigning an alias "turn on evening light" to selected X-10 Device: "F16"
   adding a new script: "turn on evening light" to the list of scripts
   add Control "turn ON" to the script:
     select "X-10 Controls" from List of Script Component Type
     select "turn on" from List of X-10 Controls
     select "Add Component to Script" from List of Scripting Actions add Device Alias "Living Room Light" to the script:
  select "Device Alias" from List of Script Component Type
  select "Living Room Light" from List of Device Alias
  select "Add Component to Script" from List of Scripting Actions
add Time "19:00" to the script:
  select "Time" from List of Script Component Type
  select "Hour" from List of Time Unit
  select "1" from List of 10× Time Value
  select "9" from List of 1× Time value
  select "Add Component to Script" from List of Scripting Actions
  select "Minute" from List of Time Unit
  select "0" from List of 10× Time Value
  select "0" from List of 1× Time value
  select "Add Component to Script" from List of Scripting Actions.
The script "turning on evening light" is now executable. Subsequent to this, "Activate Script" is selected from List of Scripting Actions to start the script.

Figure 8:
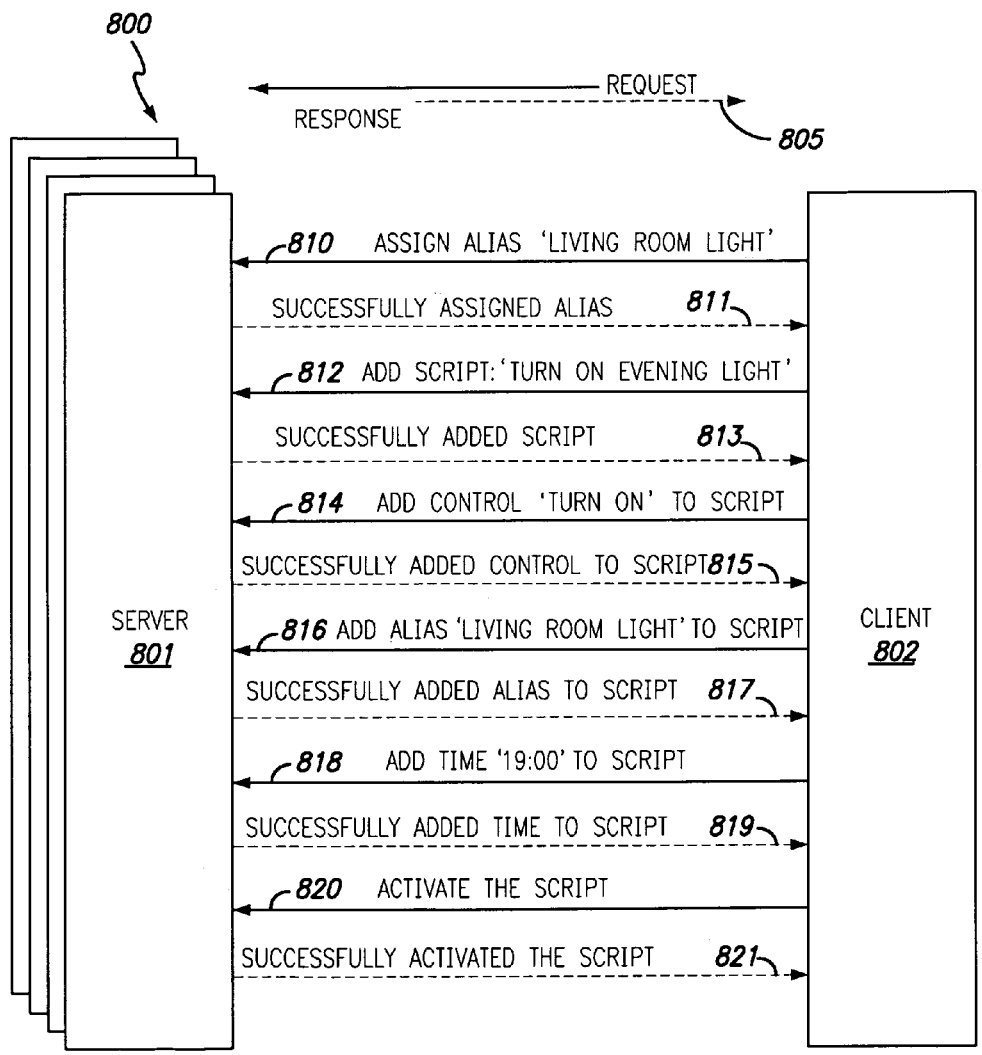
FIG. 8 illustrates an example implantation according to the current design.

The foregoing example is illustrated in FIG. 8. Point 810 illustrates assigning an alias "living room light" to an X-10 device address. Point 811 indicates, from server 801 to client 802, that the alias was successfully assigned. Point 812 adds the script "turn on the evening light," while point 813 indicates the script was added successfully. Point 814 adds the Control "turn ON" to the script, while point 815 indicates that the Control was successfully added to the script. Point 816 adds the alias "Living Room Light" to the script, and point 817 indicates that the Alias was successfully added to the script. Point 818 calls for adding the time "19:00" to the script, while point 819 indicates that the Time was successfully added. Point 820 activates the script, and point 821 indicates the script was successfully activated. Subsequent to this, the script causes the living room light to be turned on at 19:00 by executing the script.

The present design may be provided on a network or as a part of a network, and may alternately be provided on media configured to execute the functionality described herein, including but not limited to hard disks, floppy disks, CD-ROMs, DVD-ROMs, RAM, flash memory, and other appropriate media. The present design may alternatively be provided on integrated circuits. In addition, the design may be provided on a mixture of media and integrated circuits. Implementation may occur on any device in the network or on multiple devices in the network, and transmissions of messages may occur using the protocol from any device to another device.

The design presented herein and the specific aspects illustrated are meant not to be limiting, but may include alternate components while still incorporating the teachings and benefits of the invention. While the invention has thus been described in connection with specific embodiments thereof, such as in a system similar to that shown in FIG. 1, it will be understood that the invention is capable of alternate embodiments or further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A multiple element computing architecture configured to operate using a communications protocol enabling dynamic management of objects between a requesting element and a responding element in the multiple element computing architecture, the protocol enabling transmission of a message consisting essentially of:
   a destination;
   a source;
   a message type;
   a data partition arrangement, comprising a fixed number of payloads, the fixed number based on the message type; and
   a delimiter arrangement provided within the message, the delimiter arrangement separating data partitions in the data partition arrangement wherein multiple levels of data partitions are available and higher levels of data partitions are delimited based on a stacked arrangement wherein an Nth level data partition is delimited by N section delimiters positioned at the end of the Nth level data partition;
   wherein the communications protocol enables one element to prepare requesting messages with one destination, one source, one message type and optional associated payload, the one element is configured to receive the requesting message and process the message, and the multiple element computing architecture comprises at least one hardware element;
   wherein the requesting element may be configured to form sequences of actions based on resources presented according to the protocol from the responding element, pack the actions into messages, and transmit the messages to the responding element, wherein the sequences of actions vary in size and actions are packed into messages employing variable numbers of data partitions.

2. The multiple element computing architecture of claim 1, wherein a special delimiting character is used to delimit a lowest level of data partitions.

3. The multiple element computing architecture of claim 2, wherein an immediate upper level data delimiter of any existing level of data is a combination of an existing level delimiter followed by the special delimiting character.

4. The multiple element computing architecture of claim 1, wherein at least one message payload comprises at least one message.

5. The multiple element computing architecture of claim 1, wherein at least one payload comprises an array.

6. The multiple element computing architecture of claim 1, wherein the one element is configured to receive the message, interpret the message, and effectuate each command employing the payload.

7. The multiple element computing architecture of claim 1, wherein the message is configured to form part of a message record comprising multiple messages formed according to the protocol.

8. The multiple element computing architecture of claim 1, wherein the payload may contain embedded data partitions.

9. The multiple element computing architecture of claim 1, wherein any section of the message may comprise an array, and at least one member of the array may comprise a sub array, and at least one member of the sub array may comprise a further sub array, wherein members of each array, sub array, and further sub array employ the delimiter arrangement.

10. The multiple element computing architecture of claim 1, wherein the requester element is configured to dynamically acquire resource information from the responder element and act on the resource information acquired.

11. An architecture comprising a requester element and a responder element configured to facilitate transmission of information between the requester element and the responder element according to a message format configured to represent structured data, the message format comprising:
- at least one message entry comprising at least one message section comprising an entry delimiter placed after a last section of each message, the message section conforming to a protocol consisting essentially of a destination, a source, a message type, and a data partition arrangement comprising an optional fixed number of payloads, the fixed number based on message type, and a delimiter arrangement, the delimiter arrangement separating data partitions in the data partition arrangement, wherein multiple levels of data partitions are available and higher levels of data partitions are delimited based on a stacked arrangement wherein an Nth level data partition is delimited by N section delimiters positioned at the end of the Nth level data partition; and
- at least one message record comprising at least one message entry comprising a record delimiter placed after a last entry of the message record;
- wherein the requesting element may be configured to form sequences of actions based on resources presented according to the protocol from the responding element, pack the actions into messages, and transmit the messages to the responding element, wherein the sequences of actions vary in size and actions are packed into messages employing variable numbers of data partitions and the architecture comprises at least one hardware element.

12. The architecture of claim 11, wherein at least one payload comprises at least one message.

13. The architecture of claim 11, wherein at least one payload comprises an array.

14. The architecture of claim 11, wherein an element is configured to receive the message in the message format, interpret the message, and effectuate each command employing the payload.

15. The architecture of claim 11, wherein any section of the message may comprise an array, and at least one member of the array may comprise a sub array, and at least one member of the sub array may comprise a further sub array, wherein members of each array, sub array, and further sub array employ the delimiter arrangement.

16. The architecture of claim 11, wherein the requester element is configured to dynamically acquire resource information from the responder element and act on the resource information acquired.

17. A dynamic object management system comprising:
- a server device configured to receive data from a transmitting device in a message according to a protocol, the protocol consisting essentially of:
- a destination;
- a source;
- a message type;
- an arrangement of data partitions, comprising at least one command and an associated payload, the associated payload based on message type; and
- a delimiter arrangement provided within the message, the delimiter arrangement separating data partitions in the arrangement of data partitions wherein multiple levels of data partitions are available and higher levels of data partitions are delimited based on a stacked arrangement wherein an Nth level data partition is delimited by N section delimiters positioned at the end of the Nth level data partition;
- wherein the transmitting device may be configured to form sequences of actions based on resources presented according to the protocol from the server device, pack the actions into messages, and transmit the messages to the server device, wherein the sequences of actions vary in size and actions are packed into messages employing variable numbers of data partitions.

18. The dynamic object management system of claim 17, wherein the server device is configured to receive the message according to the protocol and execute the one request based on the associated payload.

19. The dynamic object management system of claim 17, wherein delimiters are provided between the destination, the source, the message type, and the associated payload, and at an end of the message.

20. The dynamic object management system of claim 17, wherein at least one payload comprises at least one message.

21. The dynamic object management system of claim 17, wherein at least one payload comprises an array.

22. The dynamic object management system of claim 17, wherein the one element is configured to receive the message, interpret the message, and effectuate each request employing the payload.

23. The dynamic object management system of claim 17, wherein the message is configured to form part of a message record comprising multiple messages formed according to the protocol.

24. The dynamic object management system of claim 17, wherein any section of the message may comprise an array, and at least one member of the array may comprise a sub array, and at least one member of the sub array may comprise a further sub array, wherein members of each array, sub array, and further sub array employ the delimiter arrangement.

25. The dynamic object management system of claim 17, wherein the requester element is configured to dynamically acquire resource information from the responder element and act on the resource information acquired.

* * * * *